(12) United States Patent
Inoue

(10) Patent No.: US 8,905,422 B2
(45) Date of Patent: Dec. 9, 2014

(54) STRADDLE TYPE VEHICLE INTERLOCKING BRAKE SYSTEM AND STRADDLE TYPE VEHICLE

(71) Applicant: Yamaha Hatsudoki Kabushiki Kaisha, Shizuoka-ken (JP)

(72) Inventor: Kazuhisa Inoue, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 13/935,030

(22) Filed: Jul. 3, 2013

(65) Prior Publication Data

US 2014/0015221 A1 Jan. 16, 2014

(30) Foreign Application Priority Data

Jul. 11, 2012 (JP) ................................. 2012-155776

(51) Int. Cl.
*B62L 3/00* (2006.01)
*B62L 3/08* (2006.01)
*B60T 11/04* (2006.01)
*B60T 11/06* (2006.01)
*B60T 11/08* (2006.01)
*B60T 8/26* (2006.01)

(52) U.S. Cl.
CPC ............. *B62L 3/08* (2013.01); *B60T 11/046* (2013.01); *B60T 11/06* (2013.01); *B60T 11/08* (2013.01); *B60T 8/261* (2013.01)
USPC ...................................... 280/281.1

(58) Field of Classification Search
CPC ............ B62L 3/08; B62L 3/00; B62K 11/00; B60T 11/08

USPC .................... 180/219; 188/2 D, 24.16, 24.22; 303/9.62, 9.64, 9.69, 9.75
See application file for complete search history.

(56) References Cited

U.S. PATENT DOCUMENTS 4,057,127 A * 11/1977 Woodring .................. 188/24.16
4,494,800 A * 1/1985 Hayashi ....................... 303/9.64
4,533,153 A * 8/1985 Tsunoda et al. ................ 280/277

(Continued)

FOREIGN PATENT DOCUMENTS

FR 2 843 349 A1 2/2004
JP 06-001279 1/1994

(Continued)

OTHER PUBLICATIONS

Extended European search report issued on Jun. 18, 2014.

*Primary Examiner* — Joseph M Rocca
*Assistant Examiner* — Gabriela C Craciun
(74) *Attorney, Agent, or Firm* — Rabin & Berdo, P.C.

(57) ABSTRACT

A brake system is disclosed. The brake system includes a front brake mechanism, a rear brake mechanism, a front brake wire, a rear brake wire, a link, a support, and an interlocking brake wire. The link is rotatable around a fulcrum on one end thereof as measured in a longitudinal direction thereof. The support elastically supports the link at the fulcrum. The interlocking brake wire is connected with the link so as to pull the front brake wire and rear brake wire. The front brake wire, the interlocking brake wire, and the rear brake wire are connected with the link in this order, starting from the end of the link with the support, as measured in a longitudinal direction of the link.

8 Claims, 6 Drawing Sheets

(56) References Cited

U.S. PATENT DOCUMENTS

| | | | |
|---|---|---|---|
| 4,664,233 A * | 5/1987 | Tsuchida et al. | 188/181 A |
| 4,773,509 A | 9/1988 | Sato | |
| 4,850,455 A * | 7/1989 | Nuti | 188/2 D |
| 8,186,470 B2 * | 5/2012 | Matayoshi | 180/227 |
| 8,287,053 B2 * | 10/2012 | Tahara et al. | 303/9.64 |
| 8,651,213 B2 * | 2/2014 | Nagakubo et al. | 180/218 |
| 2005/0241892 A1 * | 11/2005 | Tsai | 188/24.12 |
| 2007/0151816 A1 * | 7/2007 | Gil et al. | 188/2 D |
| 2007/0273202 A1 * | 11/2007 | Ogawa | 303/113.2 |
| 2009/0243380 A1 * | 10/2009 | Tahara et al. | 303/114.1 |
| 2011/0089663 A1 * | 4/2011 | Ogawa et al. | 280/301 |
| 2013/0009378 A1 * | 1/2013 | Nagakubo et al. | 280/274 |
| 2014/0008139 A1 * | 1/2014 | Inoue et al. | 180/219 |

FOREIGN PATENT DOCUMENTS

| | | |
|---|---|---|
| JP | 10-287287 | 10/1998 |
| JP | 2000-038182 A | 2/2000 |
| JP | 2000-043778 A | 2/2000 |
| JP | 2000-309294 A | 11/2000 |
| JP | 2004-042908 A | 2/2004 |
| JP | 2004-352181 A | 12/2004 |
| JP | 3738260 B2 | 11/2005 |
| JP | 2008-290699 A | 12/2008 |

* cited by examiner

STRADDLE TYPE VEHICLE INTERLOCKING BRAKE SYSTEM AND STRADDLE TYPE VEHICLE

CROSS REFERENCE TO RELATED APPLICATION

The entire disclosure of the inventor's corresponding Japanese patent application, Serial No. JP 2012-155776, filed Jul. 11, 2012, is hereby incorporated by reference.

BACKGROUND

1. Technical Field

The present invention relates to straddle type vehicle interlocking brake systems that allow front and rear brakes to work in an interlocked manner.

2. Description of the Background Art

Brake systems that can be used in a motorcycle, a type of a straddle type vehicle, are known, as disclosed in JP 3738260 A. Such a brake system includes a first brake operating device and a second brake operating device. The first brake operating device actuates the front brake following a braking operation. The second brake operating device causes the front and rear brakes to work in an interlocked manner following a braking operation.

More specifically, the second brake operating device is connected with an equalizer lever in a power divider via an interlocking coupling means. Connected with the equalizer lever is a rear brake coupling means that is connected with the rear brake, and a rotational lever is rotatably connected with the equalizer lever. The rotational lever is connected with a front brake coupling means that is connected with the front brake.

When the second brake operating device is operated, the equalizer lever first pulls the rear brake coupling means, thereby actuating the rear brake. When the second brake operating device is operated more forcefully, the equalizer lever rotates the rotational lever to pull the front brake coupling means, thereby actuating the front brake. Thus, operating the second brake operating device may cause the rear and front brakes to work in an interlocked manner, actuated in this order.

SUMMARY

In the arrangement described in JP 3738260 A, the rotational lever is rotatably connected with the equalizer lever, making the structure inside the power divider highly complicated. This means a large number of the components of the power divider, making it difficult to reduce the size of the power divider.

An object of the present invention is to provide a straddle type vehicle interlocking brake system that allows the front and rear brakes to work in an interlocked manner with a simple and compact construction.

A straddle type vehicle interlocking brake system according to an embodiment of the present invention includes a first brake mechanism for working as a brake for one of front and rear wheels, a second brake mechanism for working as a brake for the other of the front and rear wheels, a first brake wire for actuating the first brake mechanism, a second brake wire for actuating the second brake mechanism, and a link extending in one direction, an end of the first brake wire and an end of the second brake wire being connected to different points thereon as measured in a longitudinal direction thereof. The link is rotatable around a fulcrum on one end thereof as measured in a longitudinal direction thereof. The brake system also includes a support for elastically supporting the link at the fulcrum such that, when an amount of load that is at a certain value or larger acts on the link in a direction crossing a longitudinal direction thereof, the fulcrum moves in this direction, and an interlocking brake wire connected with the link so as to pull the first and second brake wires. The first, second and interlocking brake wires are connected with the link in the order: the first brake wire, the interlocking brake wire and the second brake wire, starting from the end of the link with the support toward the other end of the link as measured in a longitudinal direction thereof.

The straddle type vehicle interlocking brake system according to the embodiment of the present invention uses a single link to cause the front and rear brakes to work in an interlocked manner. This will provide an interlocking brake system with a simple and compact construction.

DESCRIPTION OF THE EMBODIMENTS

Figure 1:
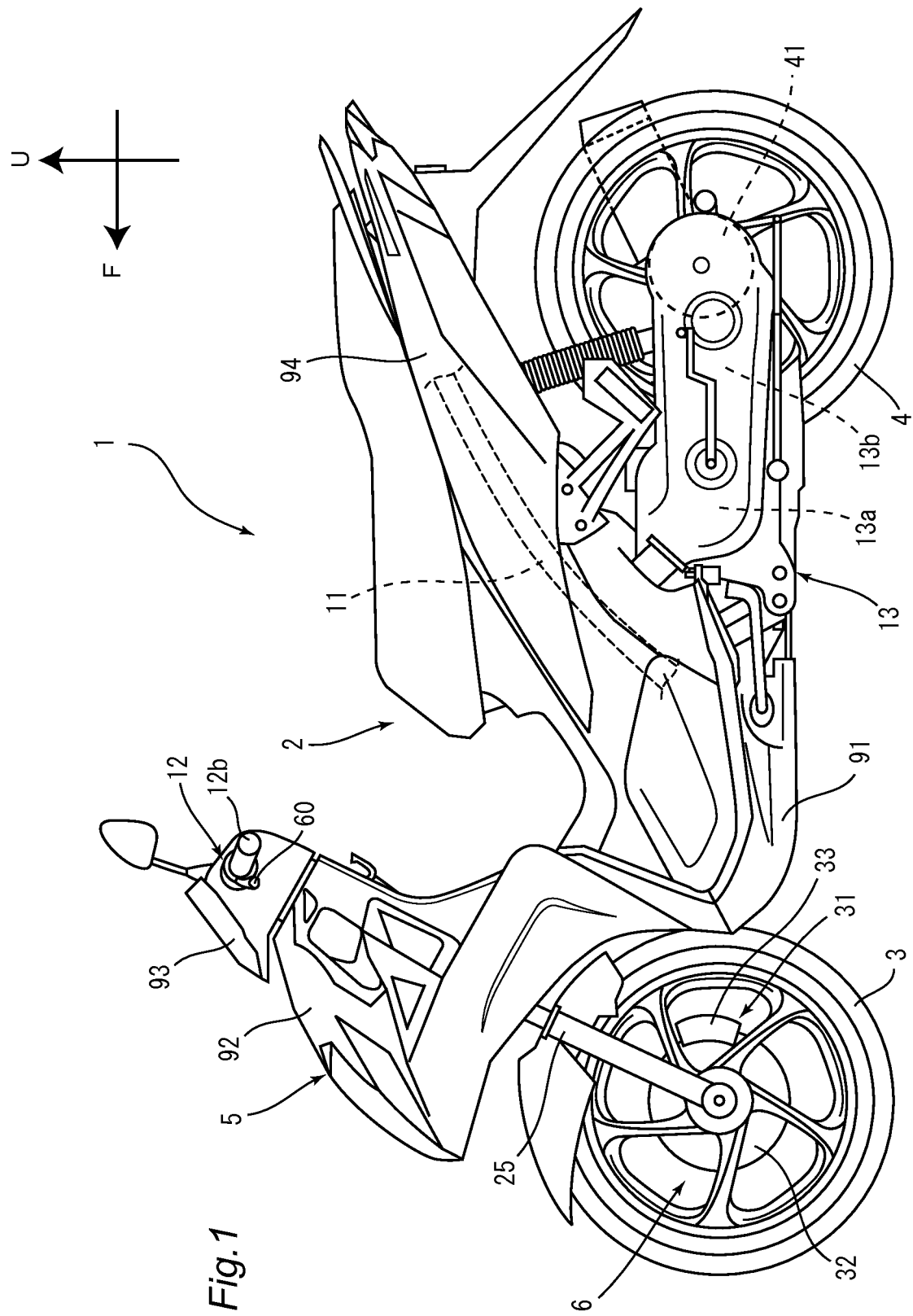
FIG. 1 is a left side view of the overall construction of a motorcycle according to an embodiment of the present invention.

Now, embodiments will be described with reference to the drawings. The dimensions of the components shown in the drawings do not exactly represent the dimensions of the actual components or the size ratios of the components.

In the description below, "front/forward", "rear/rearward," "left" and "right" mean directions as perceived by a rider holding the handlebars 12 and sitting on the seat of the motorcycle 1.

<Overall Construction of Motorcycle>

FIG. 1 is a left side view of the overall construction of a motorcycle 1 (straddle type vehicle) according to an embodiment of the present invention. The motorcycle 1 includes a vehicle body 2, a front wheel 3 located at a front portion of the vehicle body 2, and a rear wheel 4 located at a rear portion of the vehicle body 2. In FIG. 1, arrow "F" indicates the forward direction with respect to the motorcycle 1, and arrow "U" the upward direction with respect to the motorcycle 1.

The vehicle body 2 includes a body frame 11, a body cover 5, handlebars 12 and a power unit 13. The vehicle body 2 further includes a brake system 6, discussed below.

Figure 2:
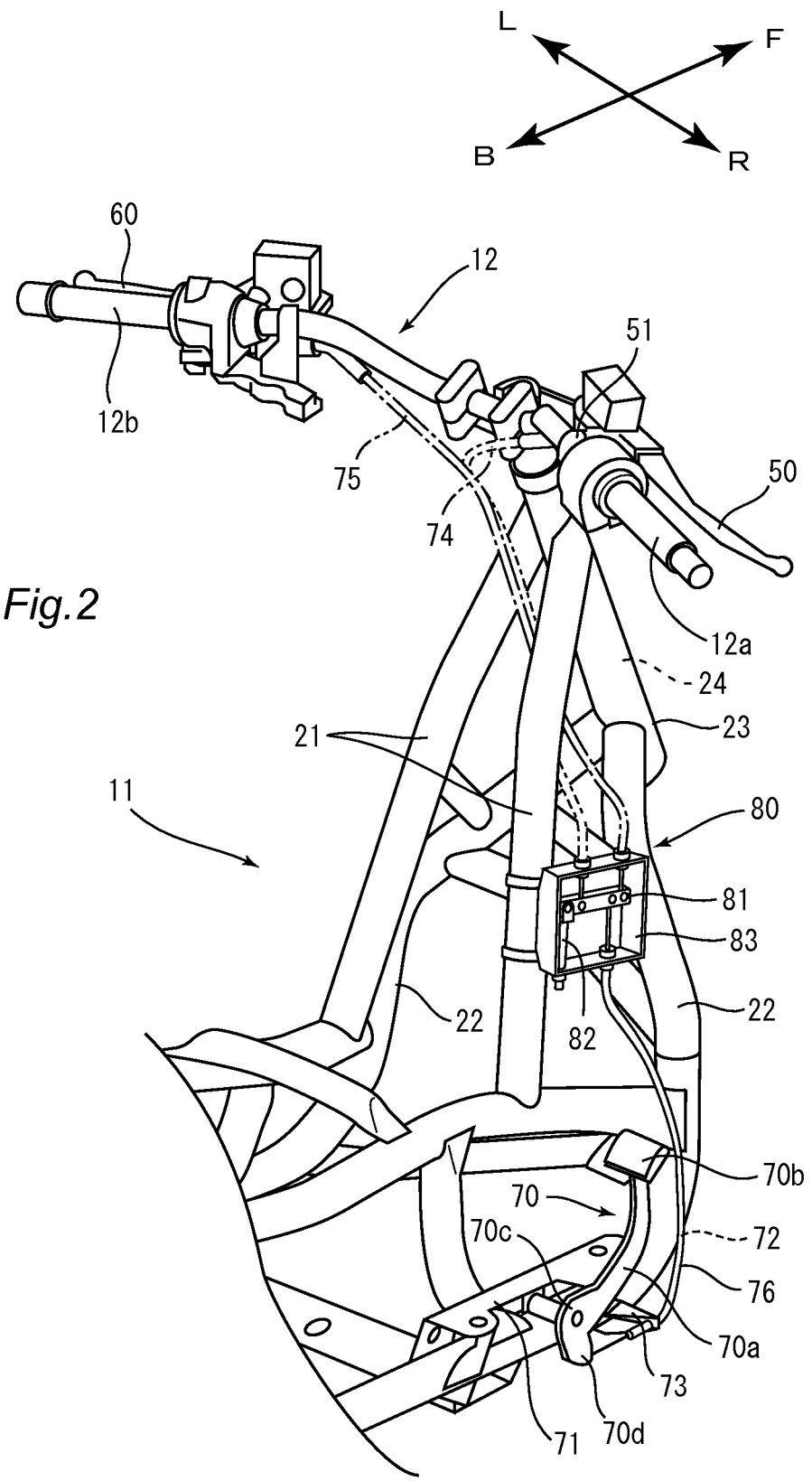
FIG. 2 is a perspective view of a front portion of the body frame of the motorcycle.

As shown in FIG. 2, the body frame 11 includes a pair of main frames 21, a pair of down frames 22 and a head pipe 23. The head pipe 23 is located in a front portion of the motorcycle 1. The main frames 21 extend rearward and downward from the head pipe 23. The down frames 22 extend downward from a position on the head pipe 23 that is located forward of the main frames 21. In FIG. 2, arrow "F" indicates the forward direction with respect to the motorcycle 1, arrow "B" the rearward direction with respect to the motorcycle 1, arrow "R" the right direction with respect to the motorcycle 1, and arrow "L" the left direction with respect to the motorcycle 1.

A steering shaft 24 is located in the head pipe 23. Above the steering shaft 24, the handlebars 12 are rotatably connected with the head pipe 23. A pair of front suspension legs 25 (see FIG. 1), located parallel to each other, are connected with the steering shaft 24. As shown in FIG. 1, the front wheel 3 is rotatably attached to the lower ends of the front suspension legs 25.

The body frame 11 with the above arrangement is covered with the body cover 5. The body cover 5 may be made of a resin material, for example. As shown in FIG. 1, the body cover 5 includes a foot board 91 located in a lower portion of the vehicle, a front cover 92 located in a front portion of the vehicle, a handle cover 93 covering the handlebars 12, and the side covers 94 located on the sides of the vehicle.

A front brake 31 including a hydraulic disc brake, for example, is provided on the front wheel 3. The front brake 31 includes a brake disc 32 and a caliper 33. The brake disc 32, together with the front wheel 3, is rotatably supported by the lower ends of the front suspension legs 25. Although not shown, the caliper 33 is attached to a portion of the front suspension leg 25 and includes, in its interior, brake pads for pressing together the brake disc 32 in a thickness direction of the disc. The brake pads are pressed against the brake disc 32 by a hydraulic pressure transferred by a hydraulic hose 34 (see FIG. 3). This action generates a braking force for the front wheel 3.

Figure 3:
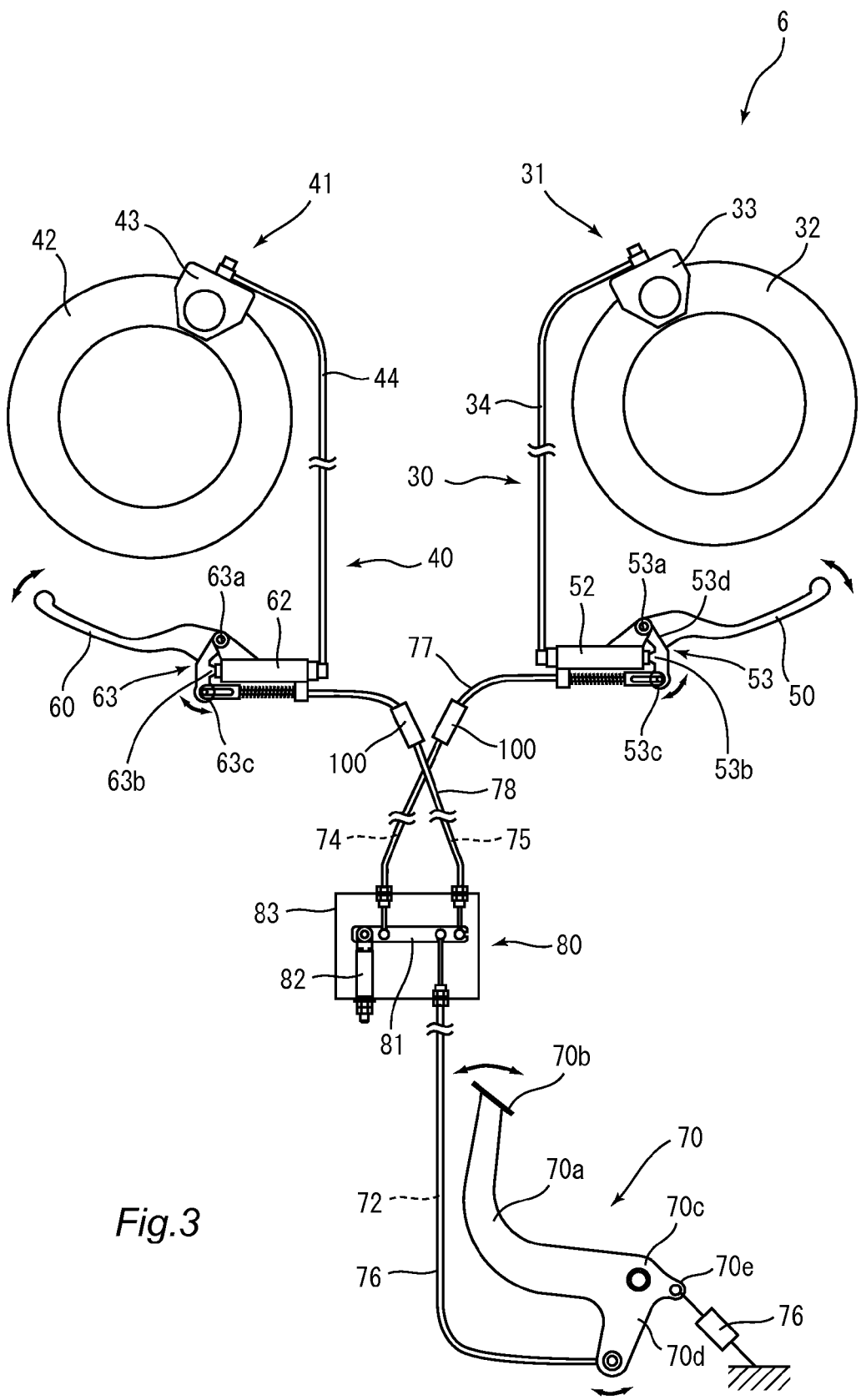
FIG. 3 is a schematic view of the overall construction of a brake system.

As shown in FIG. 3, the hydraulic hose 34 is connected with a master cylinder 52, discussed below, and transfers to the front brake 31 a hydraulic pressure generated by the master cylinder 52 as the brake pedal 70 or right brake lever 50 is operated, as discussed below.

As shown in FIG. 2, a right grip 12a is provided on the handlebars 12 and is located forward of and to the right of a rider sitting on the seat, while a left grip 12b is located forward of and to the left of the rider. Further, a right brake lever 50 that serves as the front brake operating device is provided on the handlebars 12 near the right grip 12a, while a left brake lever 60 that serves as the rear brake operating device is provided near the left grip 12b.

Figure 4:
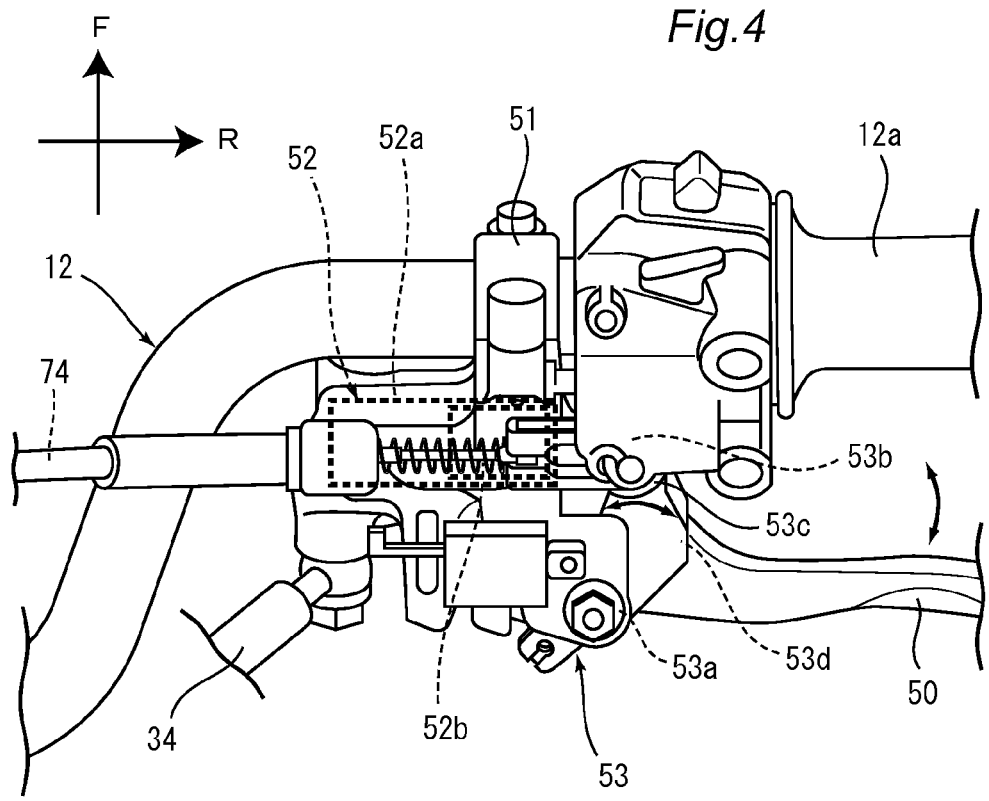
FIG. 4 is a perspective view of the right brake lever and other components.

The right brake lever 50 is rotatably supported on a connection member 51, which is attached to the handlebars 12 adjacent to the right grip 12a (see FIG. 4). Thus, the right brake lever 50 is rotatably supported on the handlebars 12 about a point on one end of the right brake lever 50. The structure of the right brake lever 50 will be detailed below. The left brake lever 60 has a similar structure to that of the right brake lever 50 and thus its description will not be given.

As shown in FIG. 2, a brake pedal 70 (interlocking brake operating device) is attached to one of the down frames 22. The brake pedal 70 may be attached to the one of the down frames 22 that is located at the right foot of a rider sitting on the seat, for example. The brake pedal 70 is rotatably supported on a support member 71 that is fixed to that down frame 22. Although not shown, the brake pedal 70 is located to penetrate the foot board 91 of the body cover 5. In other words, the top of the brake pedal 70 is exposed above the foot board 91.

An interlocking brake wire 72 is connected with the brake pedal 70 (see FIGS. 2 and 3). Pulling the interlocking brake wire 72 causes, via an equalizer 80, discussed below, the front and rear brakes 31 and 41 to work in an interlocked manner. The structure of the brake pedal 70 and equalizer 80 will be detailed below.

As shown in FIG. 1, the power unit 13 is located between the body frame 11 and rear wheel 4. The power unit 13 includes an engine 13a, and a driving force transmission 13b. The power unit 13 may also include other components. The engine 13a may be a unit-swing engine, for example, where the engine may swing in a top-to-bottom direction together with the rear wheel 4 relative to the body frame 11. The driving force transmission 13b for transmitting to the rear wheel 4 a driving force output from the engine 13a is located rearward of the engine 13a with respect to the vehicle. In other words, in the power unit 13, the engine 13a is located toward the front with respect to the vehicle, while the driving force transmission 13b is located toward the rear with respect to the vehicle. A rear brake 41 is located inward of the driving force transmission 13b as measured in a vehicle width direction, i.e. located inward of a rear portion of the power unit 13 as measured in a vehicle width direction. The driving force transmission 13b includes a continuously variable transmission that does not utilize clutch operations.

Similar to the front brake 31 described above, the rear brake 41 includes a hydraulic disc brake, for example. That is, as shown in FIG. 3, the rear brake 41 similarly includes a brake disc 42 and a caliper 43. Together with the rear wheel 4, the brake disc 42 is rotatably supported by a swing arm, not shown. The caliper 43 may have a similar structure to that of the caliper 33 of the front brake 31 and thus its description will not be given.

<Brake System>

Next, the structure of the brake system 6 (interlocking brake system) provided in the motorcycle 1 will be described in detail with reference to FIGS. 3 to 6 and 7A and 7B. In FIG. 4, arrow "F" indicates the forward direction with respect to the motorcycle 1, and arrow "R" the right direction with respect to the motorcycle 1.

As shown in FIG. 3, the brake system 6 includes a front brake mechanism 30 (first brake mechanism) and a rear brake mechanism 40 (second brake mechanism). The front brake mechanism 30 includes a front brake 31, hydraulic hose 34, master cylinder 52 and pressing member 53. The rear brake mechanism 40 includes a rear brake 41, hydraulic hose 44, master cylinder 62 and pressing member 63.

Further, the brake system 6 includes a right brake lever 50 used to actuate the front brake 31, a left brake lever 60 used to actuate the rear brake 41, and a brake pedal 70 used to cause the front and rear brakes 31 and 41 to work in an interlocked manner. Furthermore, the brake system 6 includes an equalizer 80 for causing the front and rear brakes 31 and 41 to work in an interlocked manner according to the operation received by the brake pedal 70.

(Construction of Brake Lever and Other Components)

As shown in FIGS. 3 and 4, a master cylinder 52 is located near the right brake lever 50. More specifically, as shown in FIG. 4, the master cylinder 52 is provided on the handlebars 12 and is located closer to the center of the vehicle than the right brake lever 50. The master cylinder 52 includes a cylinder 52a and a piston 52b located inside the cylinder 52a, both indicated by the broken lines in FIG. 4. The piston 52b of the master cylinder 52 may be configured to move inwardly with respect to the cylinder 52a as the right brake lever 50 is operated, for example. The master cylinder 52 may have a typical structure and thus its detailed description will not be given.

As shown in FIG. 3, the master cylinder 52 is connected with the caliper 33 of the front brake 31 via a hydraulic hose 34. In other words, a change in the hydraulic pressure inside the master cylinder 52 is transferred to the caliper 33 of the front brake 31 via the hydraulic hose 34. Thus, when the right brake lever 50 is operated, for example, to push the piston 52b inside the master cylinder 52 inwardly with respect to the cylinder 52a (see FIG. 4), the change in the hydraulic pressure in the master cylinder 52 is transferred to the caliper 33 of the front brake 31 via the hydraulic hose 34. When the hydraulic pressure increases, the caliper 33 works to press the brake disc 32 together. Thus, the front brake 31 may be actuated by operating the right brake lever 50, for example.

The structure of the right brake lever 50 and other components will be detailed below.

As shown in FIGS. 3 and 4, a pressing member 53 is provided between the right brake lever 50 and master cylinder 52 for pressing the piston 52b of the master cylinder 52. Similar to the right brake lever 50, the pressing member 53 is rotatably supported on the connection member 51 (see FIG. 4). More specifically, the pressing member 53 is rotatable about a point on the connection member 51 coaxially with the right brake lever 50. Thus, the right brake lever 50 and pressing member 53 may be rotated about a point on the connection member 51, as indicated by the corresponding arrows in FIGS. 3 and 4.

The pressing member 53 includes a supported portion 53a that is rotatably supported by the connection member 51, and is shaped to extend from the supported portion 53a toward the handlebars 12. In other words, the pressing member 53 extends to cross the handlebars 12. The pressing member 53 includes, toward the end opposite of that with the supported portion 53a (e.g., the end closer to the handlebars 12), a pressing portion 53b for pressing the piston 52b of the master cylinder 52 and a wire connecting portion 53c connected to a front brake wire 74, discussed below.

As the wire connecting portion 53c is pulled toward the center of the handlebars 12 by the front brake wire 74, the pressing member 53 with the above arrangement is rotated about a point on the supported portion 53a along a vehicle width direction, as indicated by the arrow in FIG. 4, such that the pressing portion 53b presses the piston 52b of the master cylinder 52. This causes a change in the hydraulic pressure in the master cylinder 52 such that this change in the hydraulic pressure is transferred to the caliper 33 of the front brake 31 via the hydraulic hose 34. The front brake wire 74 connected with the pressing member 53 only actuates the front brake 31.

Further, the pressing member 53 includes a contact portion 53d for contacting the right brake lever 50 when the right brake lever 50 is operated. The contact portion 53d contacts the right brake lever 50 when the right brake lever 50 is operated. In the pressing member 53, the contact portion 53d is located closer to the handlebars 12 than the supported portion 53a is so as to rotate the pressing member 53 about a point on the supported portion 53a. As the right brake lever 50 is operated, the pressing member 53 having the above-described contact portion 53d is rotated about a point on the supported portion 53a such that the pressing portion 53b presses the piston 52b of the master cylinder 52. This causes a change in the hydraulic pressure in the master cylinder 52 such that this change in the hydraulic pressure is transferred to the caliper 33 of the front brake 31 via the hydraulic hose 34.

As such, the front brake 31 may be actuated when the front brake wire 74 is pulled or when the right brake lever 50 is operated.

As shown in FIG. 3, a master cylinder 62 is provided near the left brake lever 60, similar to the right brake lever 50. The master cylinder 62 may have a structure similar to that of the master cylinder 52 described above and is connected with the rear brake 41 via a hydraulic hose 44. Detailed description of the structure and operation of the master cylinder 62 will not be given.

A pressing member 63 is provided adjacent to the left brake lever 60. The structure and operation of the pressing member 63 are similar to those of the pressing member 53 described above and thus their description will not be given. The rear brake 41 is actuated when the rear brake wire 75 is pulled or when the left brake lever 60 is operated. The rear brake wire 75 only actuates the rear brake 41. In FIG. 3, character 63a designates a supported portion of the pressing member 63, character 63b designates a pressing portion of the pressing member 63, and character 63c designates a wire connecting portion of the pressing member 63.

(Construction of Brake Pedal)

Next, the structure of the brake pedal 70 will be described with reference to FIGS. 2 and 3.

As shown in FIGS. 2 and 3, the brake pedal 70 includes an arm 70a that is bent in an L shape as a whole, and a pedal 70b provided on one end of the arm 70. The pedal 70b is located above the foot board 91. On the other end of the arm 70a and inside the foot board 91 is provided a supported portion 70c that is rotatably supported on a supporting member 71 on a down frame 22. The brake pedal 70 has a bent portion located toward the front with respect to the vehicle and is rotatable about a point on a supported portion 70c supported by the supporting member 71.

A projection 70d that protrudes downward with respect to the vehicle is provided on the other end of the arm 70a, which has the supported portion 70c (see FIG. 3). On this other end of the arm 70a there is provided a connecting portion 70e that protrudes toward the rear of the vehicle and to which one end of a spring 76 is attached (see FIG. 3). The other end of the spring 76 is connected with a bracket (not shown) that is attached to one of the down frames 22. Thus, when the brake pedal 70 is operated to rotate forward with respect to the vehicle, the spring 76 biases the brake pedal 70 back to its original position.

The projection 70d of the brake pedal 70 is connected with one end of the interlocking brake wire 72. Thus, when the rider kicks on the brake pedal 70, the interlocking brake wire 72 is pulled. The interlocking brake wire 72 is connected with the equalizer 80, as discussed below. Using the brake pedal 70 to pull the interlocking brake wire 72 causes the front and rear brakes 31 and 41 to work in an interlocked manner.

Character 73 in FIG. 2 designates a bracket for holding an outer wire 76 that contains the interlocking brake wire 72. In other words, the interlocking brake wire 72 is movable within the outer wire 76.

(Construction of Equalizer)

As shown in FIG. 2, the equalizer 80 is located between a portion of one of the down frames 22 that is close to the head pipe 23, and the main frame 21, as viewed from the side of the motorcycle 1. In other words, the equalizer 80 is located at a point on one of the down frames 22 that is close to the head pipe 23. As the equalizer 80 is located at a point on one of the down frames 22 that is close to the head pipe 23, the length of the brake wires connected with the equalizer 80, discussed below, can be minimized.

Figure 5:
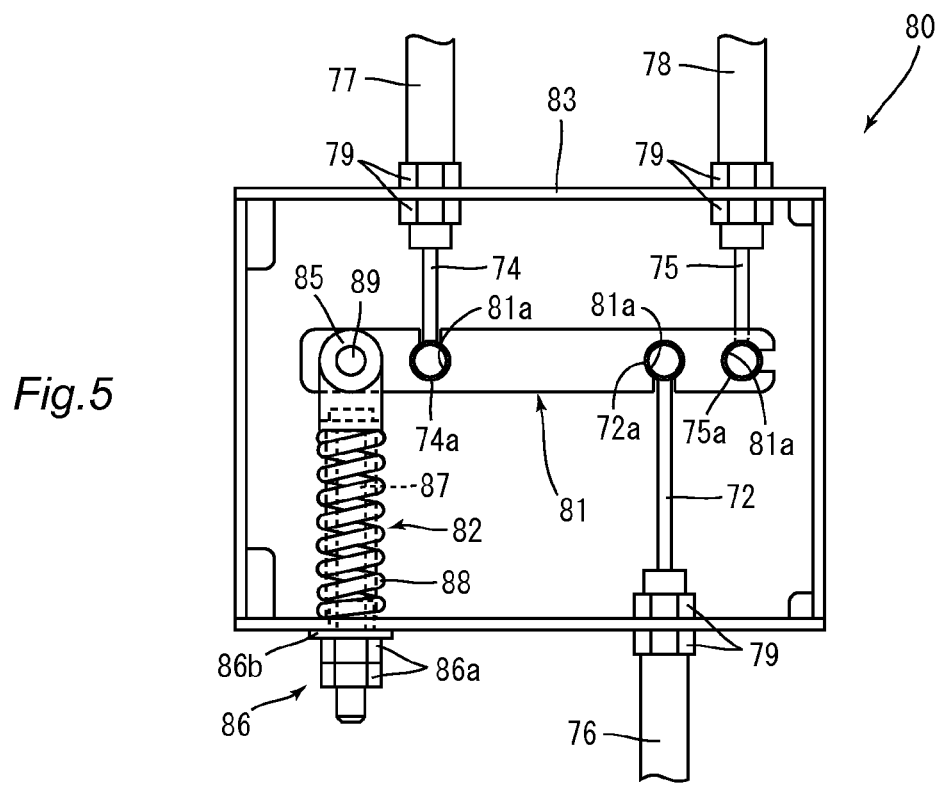
FIG. 5 is a schematic front view of the equalizer.

As shown in FIGS. 2, 3 and 5, the equalizer 80 (operating force divider) includes a link 81 shaped as a cuboid extending in one direction, a support 82 for supporting one end of the link 81 as measured in a longitudinal direction thereof, and a casing 83 for containing the link 81 and support 82.

The link 81 is a cuboid elongated in one direction and made of metal. One end of the link 81 as measured in a longitudinal direction thereof is rotatably supported by the support 82. The support 82 supports one of the sides, disposed in a width direction thereof, of this end of the link 81 as measured in a longitudinal direction thereof. In the present embodiment, as shown in FIG. 2, the link 81 extends in a front-to-rear direction with respect to the vehicle. The support 82 supports the link 81 at the lower side of a portion of the link 81 that is located toward the rear of the vehicle.

The front brake wire 74, rear brake wire 75 and interlocking brake wire 72 are connected with the link 81. More specifically, as shown in FIG. 5, the front brake wire 74, interlocking brake wire 72 and rear brake wire 75 are connected with the link 81 and disposed in this order, starting from the one end thereof, as measured in a longitudinal direction thereof, that is supported by the support 82, and in a longitudinal direction of the link 81. The interlocking brake wire 72 is connected with the same side of the link 81 as the support 82, e.g., one of the sides of the link 81 disposed in a width direction thereof (e.g., a direction crossing a longitudinal direction thereof). The front brake wire 74 and rear brake wire 75 are connected with the side of the link 81 opposite that with the interlocking brake wire 72 and support 82, e.g., the other one of the sides of the link 81 disposed in a width direction thereof.

Connecting the brake wires with the link 81 in this manner may minimize the lengths of the brake wires in the motorcycle 1. More specifically, as the front and rear brake wires 74 and 75 are connected with the same one of the sides of the link 81 disposed in a width direction while the interlocking brake wire 72 is connected with the other one of the sides of the link 81 disposed in a width direction, the interlocking brake wire 72 may extend from one side of the equalizer 80 and the front and rear brake wires 74 and 75 may extend from the other side of the equalizer 80, with the link 81 located in between. The front and rear brake wires 74 and 75 are connected with the right and left brake levers 50 and 60, respectively, located in an upper portion of the motorcycle 1, while the interlocking brake wire 72 is connected with the brake pedal 70 located in a lower portion of the motorcycle 1. Thus, as the front and rear brake wires 74 and 75 extend from one side of the equalizer 80 and the interlocking brake wire 72 extends from the other, the wires extending from the equalizer 80 may be connected with the right and left brake levers 50 and 60 and brake pedal 70 with lengths as small as possible.

As shown in FIG. 5, the ends of the front and rear brake wires 74 and 75 and interlocking brake wire 72 that are connected with the link 81 have annular wire connections 74a, 75a and 72a, respectively. The wire connections 74a, 75a and 72a are rotatably disposed in through-holes 81a that run through the link 81 in a thickness direction thereof. That is, the wire connections 74a, 75a and 72a have an outer diameter substantially equal to the diameter of the through-holes 81a formed in the link 81. Thus, when the link 81 is rotated, the wire connections 74a, 75a and 72a of the front brake wire 74, rear brake wire 75 and interlocking brake wire 72 are rotated. This configuration allows the front and rear brake wires 74 and 75 and interlocking brake wire 72 to move smoothly in a direction in which they extend when the link 81 is rotated without distorting, for example twisting, the wires.

The link 81 and support 82 are located in the cuboidal casing 83. The casing 83 may be made of metal or resin, for example. In the present embodiment, the sidewalls of the casing 83 that surround the link 81 and support 82 are constructed by combining four plates. The sidewalls and bottoms of the casing 83 may be integrally formed or, as shown in FIG. 5, one side may be open.

As the link 81 and support 82 are located in the casing 83, the link 81 and support 82 may be protected by the casing 83, and the equalizer 80 including the link 81 and support 82 may be treated as a unit. This facilitates attaching the equalizer 80 to the motorcycle 1. Further, if the link 81 and support 82 form a unit, the step of deforming the spring 88 of the support 82 for adjustment, as discussed below, may be performed before the equalizer 80 is attached to the body frame 11. This facilitates adjustment of the support 82.

The support 82 is fixed to the inner side of one of the sidewalls of the casing 83 to protrude inwardly with respect to the casing 83. The front and rear brake wires 74 and 75 and interlocking brake wire 72 are each connected with the link 81 with one end within the casing 83. Thus, the link 81 may be rotated inside the casing 83.

The front and rear brake wires 74 and 75 and interlocking brake wire 72 are movable relative to and within hollow outer wires 77, 78 and 76, respectively. A thread (not shown) is formed on the outer periphery of the end of each of the outer wires 76, 77 and 78. The thread on each of the outer wires 76, 77 and 78 is inserted into a through-hole (not shown) formed in a sidewall of the casing 83 and two nuts 79 are screwed onto it, one inside and the other outside the sidewall. Thus, the outer wires 76, 77 and 78 are fixed to the associated ones of the sidewalls of the casing 83. On the other hand, the front and rear brake wires 74 and 75 and interlocking brake wire 72 are movable relative to the outer wires 77, 78 and 76, respectively, and can move within the casing 83 based on the movement of the link 81.

The support 82 includes a connecting portion 85 that is rotatably connected with one end of the link 81 as measured in a longitudinal direction thereof, a fixing portion 86 attached to the associated one of the sidewalls of the casing 83, and a bolt 87 for connecting the connecting portion 85 with the fixing portion 86. The support 82 also includes a spring 88 (elastic member) located between the connecting portion 85 and the inner side of the associated one of the sidewalls of the casing 83 to surround the shaft of the bolt 87.

The connecting portion 85 is in a U-shape to press together the associated end of the link 81 in a width direction of the link 81. The connecting portion 85 is rotatably connected with the associated one of the ends of the link 81 via a pin 89. The connecting portion 85 has a through-hole, not shown, at its bend. The bolt 87 extends through the through-hole such that the head of the bolt 87 is located on the side of the connecting portion 85 that is close to the link 81.

The bolt 87 has a length that allows it to extend through the connecting portion 85 connected with the associated one of the ends of the link 81 and protrude outside the casing 83. In other words, the tip of the shaft of the bolt 87 protrudes outside the casing 83 and is connected with the fixing portion 86 located outside the casing 83.

The fixing portion 86 includes two nuts 86a screwed onto the thread on the shaft of the bolt 87 and a washer 86b located on the associated one of the sidewalls of the casing 83. The washer 86b includes a cylindrical protrusion and a flange expanding outward from one end of the protrusion. The washer 86b can be inserted from outside the casing 83 into the hole formed in the associated one of the sidewalls of the casing 83 such that its protrusion is located inside the casing 83. Thus, the protrusion of the washer 86b protrudes inside the casing 83. The protrusion of the washer 86b is located inside an end of the spring 88 surrounding the shaft of the bolt 87, as discussed below. The washer 86b is fixed to the casing 83 by welding.

The nuts 86a are screwed onto the thread on the shaft of the bolt 87 at the shaft's tip. In other words, the nuts 86b are screwed onto the thread on the shaft of the bolt 87, outside the casing 83. The length of the portion of the bolt 87 that is in the casing 83 may be adjusted by adjusting the position of the nuts 86a screwed onto the thread on the shaft of the bolt 87. Adjusting the length of the portion of the bolt 87 that is within the casing 83 adjusts the length of the spring 88 before application of a load, discussed below, the spring being located between the connecting portion 85 and the inner side of the associated one of the sidewalls of the casing 83. Adjusting the length of the spring 88 adjusts the amount of load that causes the spring 88 to be deformed (e.g., a deformation starting load). Thus, the bolt 87 and nuts 86 implement the deformation adjusting mechanism of the spring 88.

The spring 88 is located between the connecting portion 85 and the inner side of one of the sidewalls of the casing 83 to surround the shaft of the bolt 87. In other words, the spring 88 is pressed together by the connecting portion 85 and the inner side of one of the sidewalls of the casing 83 and elastically supports the connecting portion 85 as it is supported by the inner side of the associated one of the sidewalls of the casing 83. The spring 88 is a compression spring and can be deformed in the direction of compression when an amount of load that is at a certain value or larger is applied thereto. Thus, the spring 88 is not deformed significantly in the direction of compression when the amount of load acting in the direction of compression is below the certain value.

In the present embodiment, the spring 88 is covered with nothing within the casing 83. Alternatively, the outside of the spring 88 may be covered with a cylindrical case or the like.

The certain value is the amount of load in the direction of compression acting on the support 82 when a traction by the interlocking brake wire 72 pulls the front brake wire 74 via the link 81 to cause the front brake 31 to work, as discussed below. That is, the certain value may be changed by adjusting the amount of load that causes the spring 88 to be deformed, using the deformation adjusting mechanism of the support 82.

(Construction of Wire Adjusting Mechanism)

Figure 6:
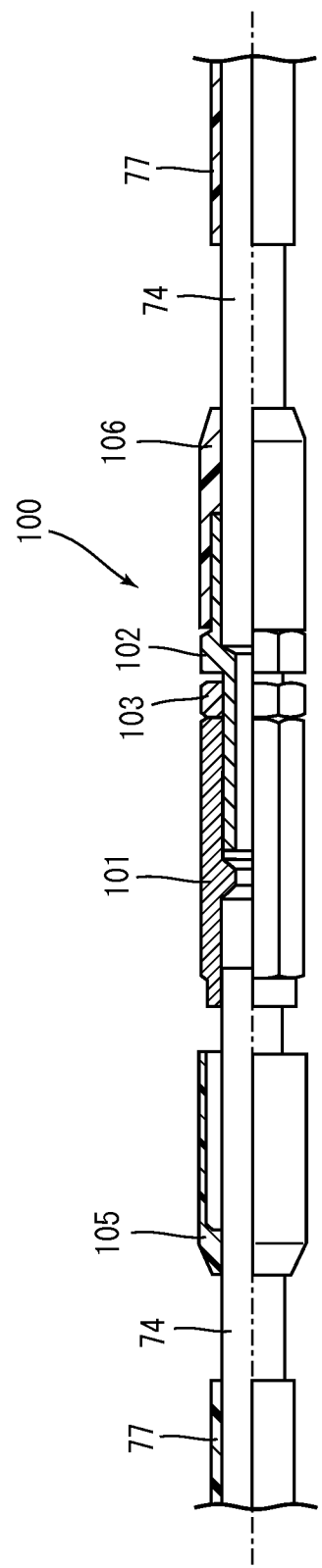
FIG. 6 is a schematic partial cross-sectional view of the wire adjusting mechanism.

As shown in FIG. 3, each of the front and rear brake wires 74 and 75 has a wire adjusting mechanism 100. The wire adjusting mechanism 100 is configured to adjust the length of the associated wire to remove the slack of the wire. Specifically, as shown in FIG. 6, the wire adjusting mechanism 100 includes a cylindrical nut 101, a bolt 102 that can be screwed into the nut 101, and a nut 103 that can be screwed onto the bolt 102 between the nut 101 and the head of the bolt 102. FIG. 6 illustrates the wire adjusting mechanism 100 for the front brake wire 74; the wire adjusting mechanism 100 for the rear brake wire 75 has the same structure.

The wire adjusting mechanism 100 connects two brake wire portions to form the single front brake wire 74. The nut 101 of the wire adjusting mechanism 100 is connected with the end of one brake wire portion. The bolt 102 of the wire adjusting mechanism 100 has a head that is connected with the end of the other brake wire portion. Screwing the bolt 102 into the nut 101 connects the two brake wire portions. At this point, adjusting the axial position of the bolt 102 relative to the nut 101 adjusts the length of the entire front brake wire 74 having two interconnected brake wire portions. In addition to the screwing of the bolt 102 into the nut 101, screwing the nut 103 onto the bolt 102 may fix the bolt 102 to the nut 101 more securely. In other words, in the present embodiment, the nuts 101 and 103 are both screwed onto the bolt 102 in double-nut relationship.

Providing the wire adjusting mechanism 100 with the above structure on each of the front and rear brake wires 74 and 75 will make it possible to remove the slack of the front and rear brake wires 74 and 75. In the present embodiment, a wire adjusting mechanism 100 is provided on each of the front and rear brake wires 74 and 75; alternatively, a wire adjusting mechanism may be provided on one of the brake wires only, or provided on the interlocking brake wire 72.

In FIG. 6, characters 105 and 106 designate covers, and character 77 designates outer wires.

<Operation of Equalizer>

Next, how the link 81 of the equalizer 80 with the above structure is operated will be described with reference to FIGS. 5 and 7A and 7B.

When the brake pedal 70 is operated to pull the interlocking brake wire 72, the link 81 is rotated or moved in the casing 83. Thus, the front and rear brake wires 74 and 75 connected with the link 81 via the link connecting portions 74a and 75a are pulled.

More specifically, the link 81 is operated in the equalizer in the following manner.

When no traction acts on the interlocking brake wire 72, the link 81 is positioned in the casing 83 such that it is generally parallel to the long sides of the casing 83, as shown in FIG. 5.

Figure 7A:
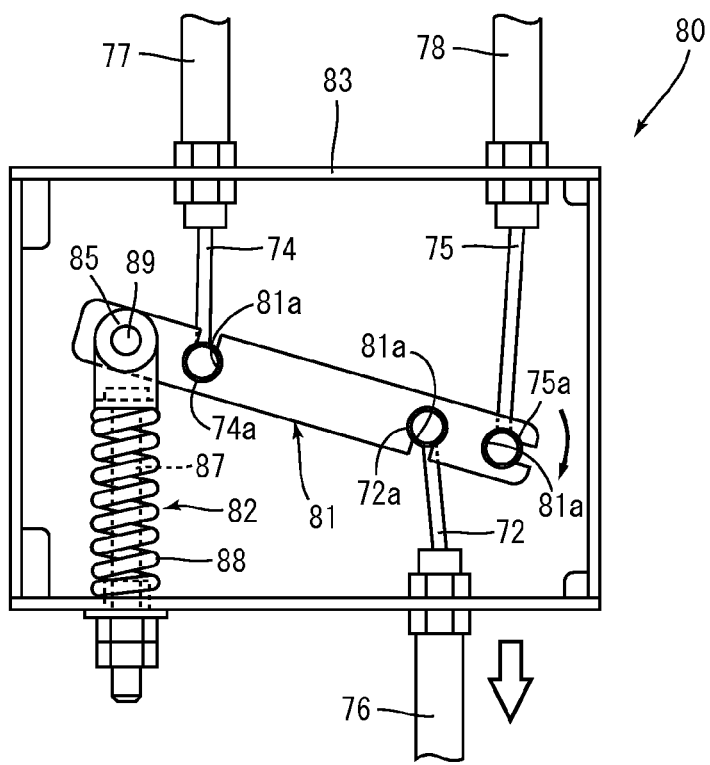
FIG. 7A illustrates how the equalizer is operated at one stage.

When the rider kicks on the brake pedal 70, the interlocking brake wire 72 is pulled in the direction indicated by the hollow arrow in FIG. 7A. Then, as indicated by the solid arrow in FIG. 7A, the link 81 connected with the interlocking brake wire 72 is rotated around the fulcrum (e.g., the pin 89) supported by the support 82. As discussed above, the rear brake wire 75 is connected with the link 81 at the end thereof, as measured in a longitudinal direction thereof that is opposite the end having the support 82, e.g., at the end of the link opposite the end having the support 82, with the interlocking brake wire 72 in between. As such, when the interlocking brake wire 72 is pulled and the link 81 is rotated, the rotation of the link 81 pulls the rear brake wire 75 and moves it with an amount larger than that for the interlocking brake wire 72.

When the rear brake wire 75 is pulled, the pressing member 63 provided near the left brake lever 60 is rotated such that the pressing portion 63b of the pressing member 63 pushes the piston of the master cylinder 62 (see FIG. 3). This increases the hydraulic pressure in the hydraulic hose 44 such that the caliper 43 of the rear brake 41 presses together the brake disc 42 to produce a braking force.

In the state shown in FIG. 7A, the link 81 is rotated around the fulcrum supported by the support 82 such that the front brake wire 74 connected with the link 81 at a position close to the support 82 is not pulled significantly. Thus, the front brake 31 is not actuated.

Figure 7B:
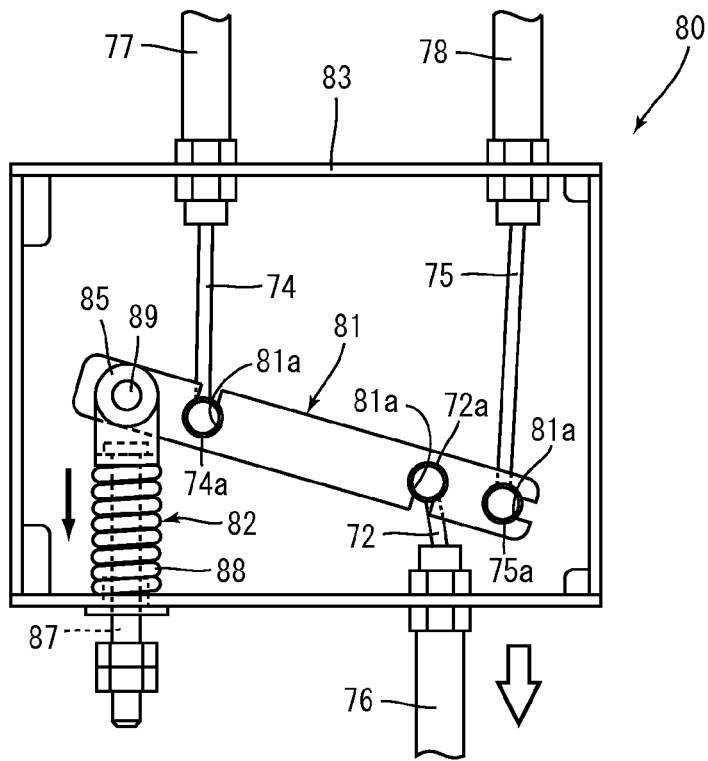
FIG. 7B illustrates how the equalizer is operated at another stage.

When the rider kicks deeper on the brake pedal 70, the interlocking brake wire 72 is pulled further downward (in the direction indicated by the hollow arrow in FIG. 7B). The traction by the interlocking brake wire 72 is transferred by the link 81 to act on the support 82 that supports the link 81 to compress the spring 88. When an amount of load that is at a certain value or larger acts on the spring 88, the spring 88 is deformed in the direction of compression (e.g., the direction indicated by the solid arrow in FIG. 7B). Thus, when the traction by the interlocking brake wire 72 causes an amount of load that is at the certain value or larger to act on the support 82 supporting the link 81, the fulcrum on the support 82 supporting the link 81 moves. Thus, the entire link 81 is drawn toward the side of the casing 83 that is associated with the interlocking brake wire 72. When an amount of load that is at a certain value or larger acts on the link 81 due to the pulling by the interlocking brake wire 72, the front and rear brake wires 74 and 75 are pulled while the amount of load that is at the certain value or larger acts on the spring 88 to move the fulcrum of the link 81.

When the entire link 81 moves toward the side of the casing 83 that is associated with the interlocking brake wire 72, the front brake wire 74 connected to a point on the link 81 that is close to the support 82 is pulled significantly. Then, the pressing member 53 provided near the right brake lever 50 is rotated such that the pressing portion 53b of the pressing member 53 pushes the piston of the master cylinder 62. This increases the hydraulic pressure in the hydraulic hose 34 such that the caliper 33 of the front brake 31 presses together the brake disc 32 to produce a braking force.

Thus, when the rider kicks on the brake pedal 70 to pull the interlocking brake wire 72, the link 81 is rotated around the fulcrum supported by the support 82 such that the rear brake wire 75 is pulled. That is, when the rider kicks on the brake pedal 70, the rear brake 41 is actuated first. Thereafter, when the rider kicks on the brake pedal 70 more forcefully and a force is transferred from the interlocking brake wire 72 to the link 81 such that an amount of load that is at a certain value or larger acts on the support 82 (e.g., an amount of load that is at a certain value or larger acts on the link 81), the spring 88 of the support 82 is compressed and the link 81 moves. This pulls the front brake wire 74 to actuate the front brake 31.

Accordingly, as the brake pedal 70 is operated, the equalizer 80 may cause the rear brake 41 and the front brake 31 to work in an interlocked manner.

In the present embodiment, a brake system 6 includes a front brake mechanism 30, a rear brake mechanism 40, a front brake wire 74 for actuating the front brake mechanism 30, and a rear brake wire 75 for actuating the rear brake mechanism 40. The brake system 6 also includes a link 81 extending in one direction, an end of the front brake wire 74 and an end of the rear brake wire 75 being connected to different points thereon as measured in a longitudinal direction thereof, the link 81 being rotatable around a fulcrum on one end thereof, as measured in a longitudinal direction thereof. The brake system 6 further includes a support 82 for elastically supporting the link 81 at the fulcrum such that, when an amount of load that is at a certain value or larger acts on the link 81 in a width direction thereof, the fulcrum of the link 81 moves in this direction. Furthermore, the brake system 6 includes an interlocking brake wire 72 connected with the link 81 so as to pull the front and rear brake wires 74 and 75. The front and rear brake wires 74 and 75 and interlocking brake wire 72 are connected with the link 81 in the order: the front brake wire 74, the interlocking brake wire 72 and the rear brake wire 75, starting from the end of the link with the support 82 toward the other end of the link 81 as measured in a longitudinal direction thereof. This configuration allows an equalizer 80 with a simple structure to cause the front and rear brakes 31 and 41 to work in an interlocked manner.

In the present embodiment, the front and rear brake wires 74 and 75 are connected with the link 81 at the same one of sides of the link 81 disposed in a width direction thereof. On the other hand, the interlocking brake wire 72 is connected with the link 81 at the one of the sides of the link 81 disposed in a width direction thereof that is opposite that with the front and rear brake wires 74 and 75. Thus, the brake wires may be connected with the right and left brake levers 50 and 60 and brake pedal 70 with lengths as small as possible. As such, the equalizer 80 may be effectively disposed in the motorcycle 1.

In the present embodiment, the interlocking brake wire 72 is connected with the link 81 at a position that is closer to the rear brake wire 75 than to the front brake wire 74. Thus, when the link 81 is rotated around the fulcrum on the link 81 by a traction by the interlocking brake wire 72, the rear brake wire 75 may be pulled with a smaller traction by the interlocking brake wire 72.

In the present embodiment, the support 82 includes a spring 88 for elastically supporting the link 81 at the fulcrum, and a deformation adjusting mechanism for adjusting an amount of load that causes the spring 88 to be deformed.

Thus, the amount of load from the link 81 required to pull the front brake wire 74 as the fulcrum of the link 81 moves may be changed. Thus, the range of the amount of kick on the brake pedal 70 where only the rear brake 41 is operated may be changed, and the range from when the rear brake 41 is operated until the rear front brake 31 is operated may be changed. Thus, the operation of the front and rear brakes 31 and 41 in the brake system 6 may be adjusted.

In the present embodiment, the brake system 6 further includes a wire adjusting mechanism 100 provided on at least one of the front and rear brake wires 74 and 75 and interlocking brake wire 72 and for adjusting the length of the wire. This configuration allows the length of the wire having the wire adjusting mechanisms 100 to be adjusted, thereby making it possible to adjust the braking efficiency of the system.

In the present embodiment, the brake system 6 further includes a casing 83 capable of containing the link 81 and support 82. The support 82 is fixed to an inner surface of the casing 83. Thus, the link 81 and support 82 may be protected by the casing 83, and the link 81 and support 82 may be treated as a unit. This configuration allows the equalizer 80 to be easily attached to the motorcycle 1.

In the present embodiment, the brake system 6 further includes a right brake lever 50 for actuating the front brake mechanism 30, and a left brake lever 60 for actuating the rear brake mechanism 40, and a brake pedal 70 for pulling the interlocking brake wire 72. The front brake mechanism 30 is constructed such that an operating force generated by operating the right brake lever 50 and a traction generated at the front brake wire 74 when the brake pedal 70 is operated are transferred independently. The rear brake mechanism 40 is constructed such that an operating force generated by operating the left brake lever 60 and a traction generated at the rear brake wire 75 when the brake pedal 70 is operated are transferred independently. This configuration allows the front and rear brakes 31 and 41 to work in an interlocked manner and also allow them to be actuated independently.

In the present embodiment, the motorcycle 1 includes a front wheel 3, a rear wheel 4, a head pipe 23 for rotatably supporting the front wheel 3, a down frame 22 extending from the head pipe 23 rearward with respect to the vehicle, and the brake system 6. The link 81 of the brake system 6 is located at a point on the down frame 22 that is close to the head pipe 23. This will minimize the lengths of the front brake wire 74, rear brake wire 75 and interlocking brake wire 72 connected with the link 81.

In the present embodiment, the motorcycle 1 further includes a footboard 91 on which a rider may place his feet, a brake pedal 70 with a portion located above the footboard 91, and a handlebar 12 connected with the front wheel 3 and rotatable relative to the head pipe 23. The front and rear brake mechanisms 30 and 40 each include a master cylinder 52 or 62 provided on the handlebar 12 and having a piston therein, and a pressing member 53 or 63 for pressing the respective piston in the respective master cylinders 52 or 62. The front brake wire 74 is connected with the pressing member 53 to actuate the master cylinder 52 of the front brake mechanism 30. The rear brake wire 75 is connected with the pressing member 63 to actuate the master cylinder 62 of the rear brake mechanism 40. The interlocking brake wire 72 is connected with the brake pedal 70.

(Other Embodiments)

Although an embodiment of the present invention has been described, the above embodiment is merely an example that may be used to carry out the present invention. As such, the present invention is not limited to the above embodiment, and the above embodiment may be modified as appropriate, without departing from the spirit of the invention.

In the above embodiment, the brake pedal 70 is an interlocking brake operating device used to cause the front and rear brakes 31 and 41 in an interlocked manner, the right brake lever 50 is a brake operating device for the front brake 31, and the left brake lever 60 is a brake operating device for the rear brake 41. Alternatively, no rear brake operating device may be provided, or no brake pedal 70 may be provided and the left brake lever 60 may serve as the interlocking brake operating device.

Further, the right brake lever may be used as a brake operating device for a brake other than the front brake 31, and the left brake lever may be used as a brake operating device for a brake other than the rear brake 41 or as a clutch lever. Furthermore, left and right brake pedals may be provided.

In the above embodiment, the master cylinder 52 of the front brake mechanism 30 and the master cylinder 62 of the rear brake mechanism 40 are located on the handlebars 12. However, the master cylinders 52 and 62 may be located anywhere on the vehicle. Further, the arrangement for actuating the master cylinders 52 and 62 is not limited to the construction of the above embodiment, and may be any arrangement suitable for master cylinders.

In the above embodiment, the equalizer 80 is located at a point on one of the down frames 22 that is close to the head pipe 23. However, the equalizer 80 may be located anywhere on the motorcycle 1.

In the above embodiment, when the interlocking brake operating device is operated, the front brake 31 is actuated later than the rear brake 41. Alternatively, the front brake 31 may be actuated first, or the front and rear brakes 31 and 41 may be actuated simultaneously.

In the above embodiment, the front and rear brakes 31 and 41 may be hydraulic disc brakes. Alternatively, the front and rear brakes 31 and 41 may be brakes of other types.

What is claimed is:

1. A straddle type vehicle, comprising:
   a front wheel;
   a rear wheel;
   a head pipe configured to rotatably support the front wheel;
   a down frame extending from the head pipe rearward with respect to the vehicle; and
   a straddle type vehicle interlocking brake system including
      a first brake mechanism configured to work as a brake for one of a front wheel and a rear wheel;
      a second brake mechanism configured to work as a brake for another of the front wheel and the rear wheel;
      a first brake wire configured to actuate the first brake mechanism;
      a second brake wire configured to actuate the second brake mechanism;
      a link extending in one direction, a first portion of the link connected to an end portion of the first brake wire and a second portion of the link connected to an end portion of the second brake wire, the first portion and the second portion being disposed at different locations of the link as measured in a longitudinal direction of the link, the link being rotatable around a fulcrum on one end portion thereof as measured in a longitudinal direction thereof;
      a support configured to elastically support the link at the fulcrum such that, when an amount of load that is equal to or greater than a predetermined value acts on the link in a direction crossing a longitudinal direction thereof, the fulcrum moves in the direction crossing the longitudinal direction; and
      an interlocking brake wire connected to the link so as to pull the first brake wire and the second brake wire;
   wherein the first brake wire, the second brake wire, and the interlocking brake wire are connected to the link in the order of the first brake wire, followed by the interlocking brake wire, and then followed by the second brake wire, starting from the end portion of the link with the support toward the other end portion of the link as measured in a longitudinal direction thereof; and
   wherein the link is disposed at a location of the down frame that is close to the head pipe; and
   the straddle type vehicle further comprising:
      a footboard on which a rider places a foot;
      a brake pedal with a portion located above the footboard; and
      a handlebar connected to the front wheel and rotatable relative to the head pipe;
      wherein the first brake mechanism and the second brake mechanism each include a master cylinder provided on the handlebar and having a piston therein, and a pressing member configured to press the respective piston in the respective master cylinder;
      wherein the first brake wire is connected to the pressing member of the first brake mechanism to actuate the master cylinder of the first brake mechanism;
      wherein the second brake wire is connected to the pressing member of the second brake mechanism to actuate the master cylinder of the second brake mechanism; and
      wherein the interlocking brake wire is connected to the brake pedal.

2. The straddle type vehicle according to claim 1, wherein:
   the first brake wire and the second brake wire are connected to the link at the same one of sides of the link disposed in the direction crossing a longitudinal direction thereof; and
   the interlocking brake wire is connected to the link at one of the sides of the link disposed in the direction crossing a longitudinal direction thereof that is opposite to that of the first brake wire and the second brake wire.

3. The straddle type vehicle according to claim 2, wherein the interlocking brake wire is connected to the link at a position that is closer to the second brake wire than to the first brake wire.

4. The straddle type vehicle according to claim 1, wherein the support includes:
   an elastic member configured to elastically support the link at the fulcrum; and
   a deformation adjusting mechanism configured to adjust an amount of load that causes the elastic member to deform.

5. The straddle type vehicle according to claim 1, further comprising a wire adjusting mechanism provided on at least one of the first brake wire, the second brake wire, and the interlocking brake wire and configured to adjust a length of the wire.

6. The straddle type vehicle according to claim 1, further comprising a casing containing the link and the support, the support being fixed to an inner surface of the casing.

7. The straddle type vehicle according to claim 1, wherein:
   the first brake mechanism is a front brake mechanism; and
   the second brake mechanism is a rear brake mechanism.

8. The straddle type vehicle according to claim 1, further comprising:
   a first brake operating device configured to actuate the first brake mechanism;
   a second brake operating device configured to actuate the second brake mechanism; and an interlocking brake operating device configured to pull the interlocking brake wire;

wherein the first brake mechanism is configured such that an operating force generated by operating the first brake operating device and a traction generated at the first brake wire when the interlocking brake operating device is operated are transferred independently; and wherein the second brake mechanism is configured such that an operating force generated by operating the second brake operating device and a traction generated at the second brake wire when the interlocking brake operating device is operated are transferred independently.

* * * * *